(12) United States Patent
Gieseke et al.

(10) Patent No.: US 7,020,044 B1
(45) Date of Patent: Mar. 28, 2006

(54) APPARATUS FOR PRODUCING GASEOUS VAPOR BAFFLE

(75) Inventors: Thomas J. Gieseke, Newport, RI (US); Robert Kuklinski, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/963,006

(22) Filed: Oct. 8, 2004

(51) Int. Cl.
*H04K 3/00* (2006.01)
*G01S 3/80* (2006.01)

(52) U.S. Cl. .......................... 367/1; 367/131; 367/901
(58) Field of Classification Search ................ 367/1, 367/131, 901; 114/242, 253
See application file for complete search history.

(56) References Cited

U.S. PATENT DOCUMENTS

| | | | |
|---|---|---|---|
| 3,910,215 A | 10/1975 | Soderman | |
| 3,915,106 A | 10/1975 | DeWitt | |
| 4,745,584 A | 5/1988 | Andersen | |
| 5,008,863 A | 4/1991 | Archibald | |
| 5,513,149 A * | 4/1996 | Salmi et al. ................ | 367/1 |
| 5,524,568 A | 6/1996 | Bobst | |
| 5,717,657 A * | 2/1998 | Ruffa ..................... | 367/901 |
| 5,787,048 A * | 7/1998 | Sanford ................... | 367/1 |
| 6,088,296 A | 7/2000 | Seaman et al. | |
| 6,095,076 A | 8/2000 | Nesbitt | |
| 6,167,829 B1 | 1/2001 | Lang | |
| 6,744,694 B1 * | 6/2004 | Gieseke et al. ............ | 367/1 |

\* cited by examiner

*Primary Examiner*—Ian J. Lobo
(74) *Attorney, Agent, or Firm*—James M. Kasischke; Jean-Paul A. Nasser; Michael P. Stanley

(57) ABSTRACT

An apparatus that produces a gaseous vapor baffle that isolates an undersea sonar system from acoustic noise. The apparatus allows for craft carrying undersea sonar systems to travel at relatively high speeds while substantially isolating the undersea sonar systems from acoustic noise interference produced by propulsion systems, hull appendages, waves and bubbles. The apparatus has a support strut that has one end that is joined or attached to the hull of a craft. A sonar pod is attached to the other end of the support strut. The support strut has a ventilation duct and a plurality of ventilation ports. A cavitator is attached to the support strut and produces a sheet cavity as the craft travels in the water. Pressurized air or other gases are injected into the ventilation duct which then exit through the ventilation ports and into the sheet cavity. The pressurized air or gas exiting the ventilation ports expands the sheet cavity to form a gaseous vapor baffle that isolates the sonar pod from acoustic noise.

14 Claims, 1 Drawing Sheet

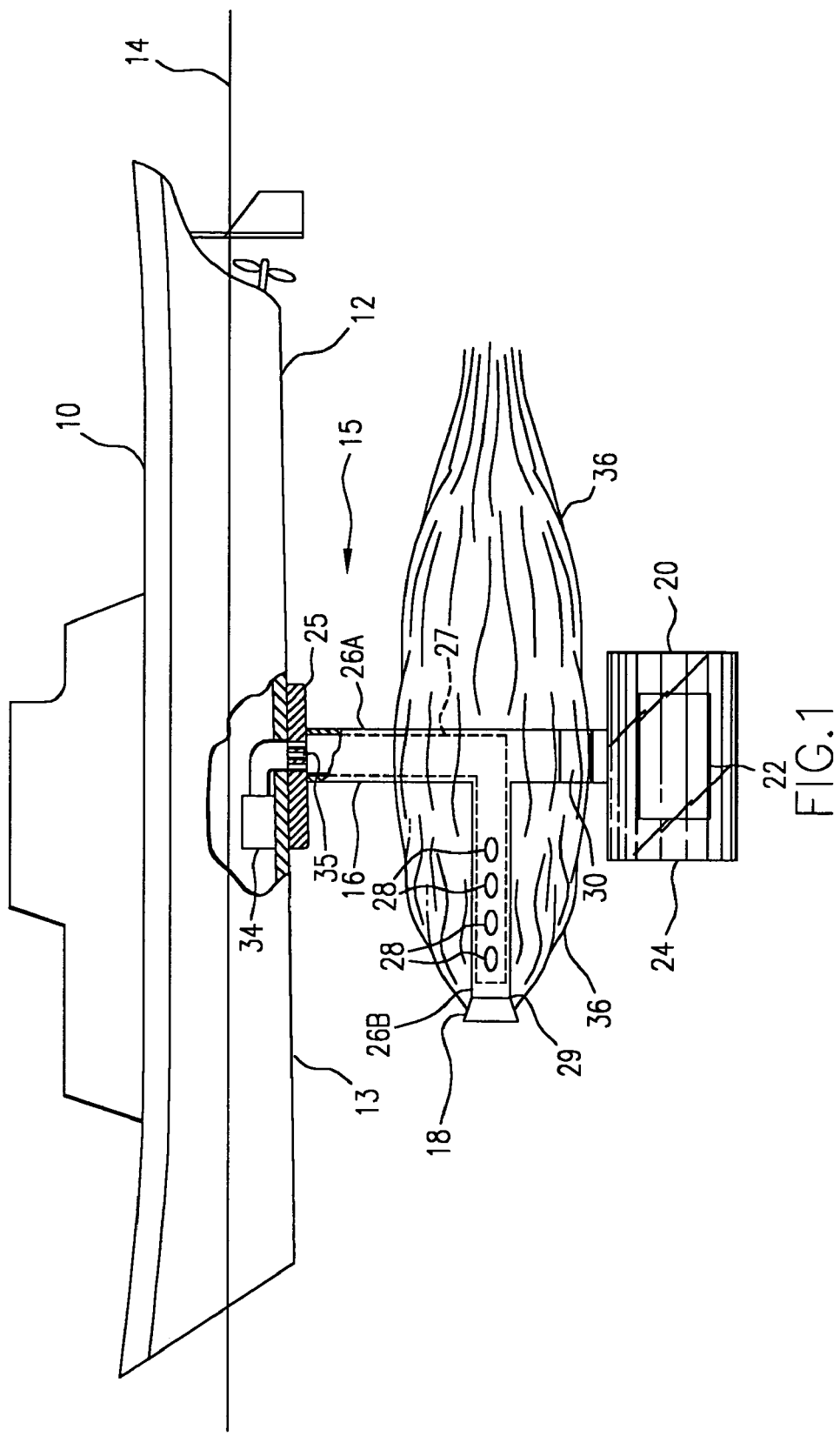

APPARATUS FOR PRODUCING GASEOUS VAPOR BAFFLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to an apparatus that produces gaseous vapor baffling.

2. Description of the Prior Art

Many of today's ships and surface vessels operate at speeds exceeding 30 knots. However, when ships and vessels travel at these speeds, acoustic noise is generated from bubbly wakes, noisy propulsion devices and appendages. If these ships or vessels have sonar arrays attached to their hulls, or are towing sonar arrays in their wakes, the operation of such sonar arrays are adversely affected by the aforementioned acoustic noise. Specifically, the turbulent flow of water over the fairing structure of the sonar array generates pressure fluctuations on the fairing structure. Both turbulent boundary layers and turbulent wakes contribute to this type of structural excitation. The sonar array can experience these pressure fluctuations directly when the flow over the sonar array is turbulent, or indirectly when these pressure fluctuations propagate through the fairing structure or the support strut supporting the sonar array and into the sonar array. Fluctuating cavitation bubbles and collapsing vapor bubbles also produce significant noise that propagates through support struts and other structures connected to the sonar array. Noise generated by the vessel propulsion system also generates a significant amount of acoustic noise. Blade tonals, cavitation bubbles, and entrained air all generate noise that propagates through the environment to the sonar array. Similarly, breaking bow-waves, hull slapping, ship machinery noise, and other ship related noise sources also can affect operation of the sonar array. Furthermore, a mechanical path from the noise source through the structure supporting the sonar array exacerbates the acoustic noise problem. Thus, the ability of these sonar arrays to detect obstacles, marine mammals, debris and mines is significantly degraded as a result of the acoustic noise interference.

The prior art reveals several sonar systems, sonar support systems and particular design configurations for water craft. Soderman U.S. Pat. No. 3,910,215 discloses a hydrofoil that is pivotally mounted to a vehicle to allow the hydrofoil to absorb shocks. Dewitt U.S. Pat. No. 3,915,106 discloses a hydrofoil incorporating a ventilation system for introducing air into the flow over the hydrofoil. Andersen U.S. Pat. No. 4,745,584 discloses a transducer array mounted in a fairing. Archibald U.S. Pat. No. 5,008,863 discloses a sonar support system that has a sonar array mounted in a hydrofoil that is supported on a strut that is coupled to a ship. Bobst U.S. Pat. No. 5,524,568 discloses the use of a ventilation system to inject air at a plurality of spaced-apart aperture arrays formed in the hull of a boat. Seaman et al. U.S. Pat. No. 6,008,296 discloses a transducer array mounted in a hydrofoil-shaped fairing. Nesbitt U.S. Pat. No. 6,095,076 discloses the use of flexible struts to support hydrofoils. Lang U.S. Pat. No. 6,167,829 discloses the injection of air to form a gas cavity over a marine vehicle component such as a hydrofoil. Air is injected at either end of the component.

None of these prior art patents disclose, teach or suggest the apparatus of the present invention which employs a novel technique to reduce acoustic noise interference with undersea sonar arrays or systems that are joined or attached to the underside of a ship or vessel.

SUMMARY OF THE INVENTION

Therefore, an object of the present invention is to provide an apparatus for producing a gaseous vapor baffle that can be used to provide isolation from acoustic noise.

Another object of the present invention is to provide an apparatus for producing a gaseous vapor baffle that isolates a sonar array from acoustic noise.

A further object of the present invention is to provide an apparatus for producing a gaseous vapor baffle that is relatively inexpensive to manufacture.

Another object of the present invention is to provide an apparatus for producing a gaseous vapor baffle that minimizes hydrodynamic noise by maintaining laminar flow over the sonar array and to physically isolate the sonar array from portions of the sonar array support structure that are subjected to relatively large pressure fluctuations.

Other objects and advantages of the present invention will be apparent from the ensuing description.

The present invention is directed to an apparatus that produces a gaseous vapor baffle that isolates an undersea sonar system from acoustic noise. The apparatus allows for craft carrying undersea sonar systems to travel at relatively high speeds while substantially isolating the undersea sonar systems from acoustic noise interference produced by propulsion systems, hull appendages, waves and bubbles. The apparatus comprises a support strut that has one end that is joined or attached to the hull of a craft. A sonar pod is attached to the other end of the support strut. The support strut has a ventilation duct and a plurality of ventilation ports. A cavitator is attached to the support strut and produces a sheet cavity as the craft travels in the water. Pressurized air or other gases are injected into the ventilation duct which then exit through the ventilation ports and into the sheet cavity. The pressurized air or gas exiting the ventilation ports expands the sheet cavity to form a gaseous vapor baffle that isolates the sonar pod from acoustic noise. The impedance mismatch between the gaseous vapor baffle and the water isolates the sonar pod from acoustic noise.

In one aspect, the present invention is directed to an apparatus for producing a gaseous vapor baffle, comprising a support strut which has a ventilation duct, at least one ventilation port, and a portion that is configured to be joined to a craft. The apparatus further comprises a cavitator joined to the support strut to produce a sheet cavity that intersects the support strut when the craft travels through a liquid medium, and a device to generate pressurized gas and inject the pressurized gas into the ventilation duct of the support strut. The pressurized gas exits the ventilation port and expands the sheet cavity to form a gaseous vapor baffle as the craft travels through the liquid medium.

In a related aspect, the present invention is directed to a sonar system that comprises a support strut which has a ventilation duct therein, at least one ventilation port, and a portion that is configured to be joined to a craft. The sonar system further comprises a cavitator joined to the support strut to produce a sheet cavity that intersects the support strut when the craft travels through a liquid medium, and a device to generate pressurized gas and inject the pressurized gas into the ventilation duct of the support strut. The pressurized gas exits the ventilation port and expands the sheet cavity to form a gaseous vapor baffle as the craft travels through the liquid medium. The sonar system further comprises a noise isolation device joined to a portion of the support strut, and a sonar device joined to the noise isolation device such that the sonar device is below the gaseous vapor baffle when the craft is traveling through the liquid medium, and wherein the noise isolation device reduces the propagation of acoustic noise from the support strut to the sonar device. The gaseous vapor baffle functions as a barrier that substantially isolates the sonar system from acoustic noise produced by the operation of the craft, movement of the craft through the liquid medium, and the result of turbulent flow upon the apparatus or portions thereof.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawing, in which:

FIG. 1 is a side view of a craft having the apparatus of the present invention joined thereto.

DESCRIPTION OF THE PREFERRED EMBODIMENTS

Referring to FIG. 1, there is shown craft 10. Craft 10 includes hull 12 which has exterior surface 13 that is exposed to liquid medium 14 (e.g., ocean water). The apparatus of the present invention is generally indicated by reference number 15. In this embodiment of the invention, apparatus 15 is joined or attached to hull 12. Although the present description is in terms of apparatus 15 being joined, attached or coupled to the hull of a craft, it is to be understood that apparatus 15 can be joined or attached to other types of water-oriented vehicles or devices. Accordingly, as used herein, the term "craft" shall include ships, pleasure boats, research vessels, towed sonar support structures, tow drogue, submarines and any other vessel, device or vehicle configured to travel on or through a liquid medium or body of water (e.g. oceans, seas, lakes, rivers, etc.) Apparatus 15 generally comprises support strut 16, cavitator 18 and sonar pod 20. Sonar pod 20 comprises sonar array 22 and other sonar components which are not shown, but which are well known in the art. Sonar array 22 can be of any standard design known in the art, including cylindrical, spherical and conformal designs. In a localization system, sonar array 22 will typically operate at relatively high frequencies and, consequently, will be relatively small in size, typically several feet in diameter. Sonar pod 20 further includes acoustically transparent fairing structure 24 which encloses sonar array 22 and reduces hydrodynamic noise, but does not eliminate such hydrodynamic noise.

In one embodiment, support strut 16 is attached, joined or coupled to mount 25. Mount 25 is attached to exterior surface 13 of hull 12. In one embodiment, support strut 16 is removably attached to mount 25. In another embodiment, support strut 16 is permanently fixed to mount 25. However, it is to be understood that support strut 16 can be attached to hull 12 by any suitable technique. Support strut 16 supports the remaining components of apparatus 15. Support strut 16 has a substantially streamlined design so as to minimize drag and acoustic noise generation. In one embodiment, support strut 16 is extendable so as to increase or decrease the distance between hull 12 and sonar pod 20. Support strut 16 comprises first portion 26A and second portion 26B. First portion 26A extends downward in a generally vertical orientation. Second portion 26B extends outward from first portion 26A and is angulated with respect to first portion 26A. In one embodiment, second portion 26B is generally perpendicular to first portion 26A. However, second portion 26B may be angulated to other suitable degrees of angulation. Second portion 26B extends to distal end 29. Support strut 16 comprises ventilation duct 27 (shown in phantom) which extends throughout support strut 16. Support strut 16 also has therein cables, connectors and other signal components, all of which not being shown but which are known in the art, that extend to sonar pod 20, for transferring signals to and from sonar pod 20. Support strut 16 further comprises at least one ventilation port 28, and, preferably a plurality of ventilation ports 28 that are located in second portion 26B. In one embodiment, ventilation ports 28 are consecutively arranged in a linear formation.

Apparatus 15 further includes mechanical isolation system 30 that controls the acoustic path from craft 10 to sonar pod 20. In one embodiment, mechanical isolation system 30 is an active acoustic noise isolation system well known in the art. In another embodiment, mechanical isolation system 30 is a passive acoustic noise isolation system, also well known in the art. Mechanical isolation system 30 prevents any acoustic noise that is propagating through support strut 16 from penetrating sonar pod 20.

Cavitator 18 is configured to generate a sheet cavity in response to movement of craft 10 through the liquid medium (e.g. ocean, river, etc.). In one embodiment, cavitator 18 is configured as a substantially flat plate that is positioned substantially normal to the direction of travel of craft 10. Other cavitator configurations are discussed in the ensuing description. Preferably, cavitator 18 is positioned forward of sonar pod 20 so as to create a sheet cavity that extends over and sufficiently far aft of sonar pod 20. This sheet cavity forms an initial baffle from acoustic noise emanating from craft 10 or resulting from turbulent flow. Apparatus 15 further includes pressurized air or gas source 34. In a preferred embodiment, pressurized air or gas source 34 is located within craft 10. Pressurized air or gas source 34 injects pressurized air or other gases through inlet 35 in mount 25 and into ventilation duct 27. The pressurized air or gas exits ventilation ports 28 and enters the sheet cavity produced by cavitator 18. As a result, the pressurized air or gas significantly expands the sheet cavity produced by cavitator 18 to form gaseous cavity 36. Gaseous cavity 36 extends aft of cavitator 18. The pressure and amount of the air or gas injected into ventilation duct 27 can be varied in accordance with the size of cavitator 18 and the speed of craft 10. As the speed of the craft decreases, ventilation rates are increased so as to maintain the desired size of gaseous cavity 36. Gaseous cavity 36 functions as a gaseous vapor baffle that isolates sonar pod 20 from acoustic noise resulting from the operation of craft 10, the movement of craft 10 through the liquid medium, or turbulent flow. Gaseous cavity 36 intersects with support strut 16 at a location above mechanical isolation system 30. However, any acoustic noise produced by the intersection of gaseous cavity 36 and support strut 16 is prevented from propagating to sonar pod 20 by mechanical isolation system 30.

As a result of mechanical isolation system 30 and gaseous cavity 36, there is no direct path between the noise sources of craft 10 and sonar pod 20. The noise produced by cavitator 18 and gaseous cavity 36 are minimal because the flow separating from cavitator 18 is laminar (no fluctuating edge forces) and gaseous cavity 36 closes as a plurality of relatively large air bubbles. Thus, apparatus 15 substantially eliminates the acoustic and structural path between craft 10 and sonar pod 20 thereby isolating sonar pod 20 from noise produced by the craft as well as turbulence-related noise. An important advantage of apparatus 15 is that it allows craft 10 to operate at relatively high speeds with relatively low sonar array noise.

In an alternate embodiment of the invention, cavitator 18 is configured as a lifting foil. When cavitator 18 is configured as a lifting foil, there are several advantages. For example, a lifting foil cavitator lifts and stabilizes the tow ship and creates relatively less impedance when the ventilation function of strut 16 is not used. The actual structural configuration of cavitator 18 depends upon the length of support strut 16 and volume flow rate of gas injected into gaseous cavity 36. In another embodiment of the invention, cavitator 18 is configured to have a wedge-shaped design. In yet a further embodiment, cavitator 18 is configured as a hydrofoil.

In an alternate embodiment, craft 10 has a retractable host platform (not shown) to which apparatus 15 is joined or attached. Such a configuration allows apparatus 15 to be retracted into craft 10. Although the foregoing description is in terms of apparatus 15 being attached or joined to the hull of a craft, it is to be understood that apparatus 15 can be utilized in other scenarios. For example, apparatus 15 can be part of a towed array system wherein support strut 16 is attached to a tow drogue and the tow drogue is pulled by a surface ship or an aircraft.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

What is claimed is:

1. An apparatus for producing a gaseous vapor baffle comprising:
   a support strut having a ventilation duct, at least one ventilation port, and a portion that is configured to be joined to a craft, said support strut comprising a first portion that is generally vertically oriented, and a second portion that outwardly extends from said first portion, said second portion extending to a distal end portion;
   a cavitator joined to said support strut to produce a sheet cavity that intersects said support strut as the draft travels through a liquid medium;
   a device to generate pressurized gas and inject said pressurized gas into said ventilation duct of said support strut so that said pressurized gas exits said at least one ventilation port and expands said sheet cavity to form a gaseous vapor baffle as the craft travels through the liquid medium; and
   a noise isolation device in said first portion wherein said gaseous vapor baffle comprises a position between said craft and said noise isolation device.

2. The apparatus according to claim 1 wherein said second portion is generally perpendicular to said first portion.

3. The apparatus according to claim 1 wherein said cavitator is joined to said distal end portion, and wherein the sheet cavity produced by said cavitator when the craft travels through the liquid medium intersects with said first portion of said support strut.

4. The apparatus according to claim 1 wherein said at least one ventilation port is located in said second portion.

5. The apparatus according to claim 4 wherein said at least one ventilation port comprises a plurality of ventilation ports.

6. The apparatus according to claim 5 wherein said plurality of ventilation ports are consecutively arranged in a generally linear orientation.

7. The apparatus according to claim 1 wherein said cavitator comprises a generally flat plate that is positioned so that it is substantially normal to the direction of travel of the craft.

8. A sonar system, comprising:
   a support strut having a ventilation duct, at least one ventilation port, and a portion that is configured to be joined to a craft;
   a cavitator joined to said support strut to produce a sheet cavity that intersects the support strut as the craft travels through a liquid medium;
   a device to generate pressurized gas and inject said pressurized gas into said ventilation duct of said support strut so as to cause said pressurized gas to exit said at least one ventilation port and expand the sheet cavity to form a gaseous vapor baffle as the craft travels through the liquid medium;
   a noise isolation device joined to a portion of said support strut; and
   a sonar device joined to said noise isolation device such that said sonar device is located substantially beneath the gaseous vapor baffle when the craft travels through the liquid medium, and wherein said noise isolation device substantially reduces propagation of acoustic noise from said support strut to said sonar device, and wherein said gaseous vapor baffle substantially isolates said sonar device from acoustic noise produced by the operation of the craft, movement of the craft through the liquid medium, and turbulent flow upon the apparatus or portions thereof.

9. The sonar system according to claim 8 wherein said support strut comprises a first portion that is generally vertically oriented, and a second portion that outwardly extends from said first portion, the second portion extending to a distal end portion.

10. The sonar system according to claim 9 wherein said second portion is generally perpendicular to said first portion.

11. The sonar system according to claim 9 wherein said cavitator is joined to said distal end portion and wherein the sheet cavity produced by said cavitator when the craft travels through the liquid medium intersects with said first portion of said support strut.

12. The sonar system according to claim 11 wherein said at least one ventilation port is located in said second portion.

13. The sonar system according to claim 12 wherein said at least one ventilation port comprises a plurality of ventilation ports.

14. The sonar system according to claim 13 wherein the ventilation ports are consecutively arranged in a generally linear orientation.

* * * * *